Patented May 29, 1923.

1,457,114

UNITED STATES PATENT OFFICE.

AUGUST LEOPOLD LASKA AND ARTHUR ZITSCHER, OF OFFENBACH-ON-THE-MAIN, GERMANY, ASSIGNORS TO THE CORPORATION CHEMISCHE FABRIK GRIESHEIM-ELEKTRON, OF FRANKFORT-ON-THE-MAIN, GERMANY.

AZO DYESTUFFS AND PROCESS OF MAKING SAME.

No Drawing.   Application filed January 8, 1923.  Serial No. 611,503.  REISSUED

*To all whom it may concern:*

Be it known that we, AUGUST LEOPOLD LASKA and ARTHUR ZITSCHER, both citizens of Germany, and residents of Offenbach-on-the-Main, Germany, have invented certain new and useful Improvements in Azo Dyestuffs and Processes of Making the Same, of which the following is a specification.

Our invention relates to especially valuable dyestuffs, which can be obtained by combining any diazocompound with ortho-alkyloxyarylides of the 2.3-oxynaphthoic acid of the general formula:

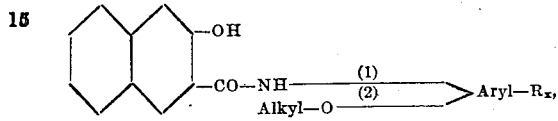

wherein R means hydrogen or any radicle.

The dyestuffs can be used for the production of color lakes of an excellent fastness to light and give, when produced on the fiber, orange to blue and black shades of a singular fastness to light, they are when dry orange to blue and black powders, insoluble in water, soluble in sulfuric acid to a violet to green solution yielding upon reduction with stannous chloride an amin and an ortho-alkyloxyarylamin of the 1-amino-2-oxy-3-naphthoic acid.

The invention is illustrated by the following examples:

EXAMPLE 1.

A diazo-solution, prepared in the usual manner from 16.2 parts of 2.5-dichloroanilin, is poured, while well stirring, into an aqueous suspension of 30.7 parts of ortho-anisidid of the 2.3-oxynaphthoic acid, prepared by dissolving it in dilute caustic soda lye and precipitating with dilute acetic acid. The dyestuff separates in brightly reddish flakes, it is filtered, when the combination is complete, washed until neutral and advantageously used in the form of a paste. Mixed with the usual substrata it forms color lakes of an excellent fastness to light. Instead of ortho-anisidid we may use ortho-phenetidid of the 2.3-oxynaphthoic acid.

EXAMPLE 2.

*Production of the dyestuffs on the fiber.*

*Padding-bath.*

10 gr. of ortho-anisidid of 2.3-oxynaphthoic acid are well stirred with 20 ccm. of caustic soda lye of 34° Bé. and 20 ccm. of Turkey red oil, dissolved with 200 ccm. of hot water and made up to 1 litre.

The cotton goods, which are impregnated with this solution, are well wrung out and then developed in the following:

*Dye-bath.*

3 gr. of 4-chloro-1.2-toluidin are diazotized in the usual manner, the solution is diluted with cold water to 1 litre, neutralized with sodium acetate and 50 gr. of common salt are added.

The dyed goods are rinsed, as usually, with cold and warm water, then soaped, while well boiling, rinsed again and dried.

*Printing-directions.*

The textile fabric is impregnated with a solution of 12 gr. of 5-chloro-ortho-anisidid of 2.3-oxynaphthoic acid per litre, dried and then printed with the following printing-color:

300 gr. of 4-chloro-1.2-toluidin are diazotized in the usual manner and the diazosolution is made up to 10 litres.

*Printing-color.*

4500 ccm. of the diazo solution,
4000 gr. of tragacanth thickening 1:20,
1000 ccm. of aluminium sulfate 1:1,
500 ccm. of sodium acetate 1:1

10 kg.

After printing the goods are dried at 40–50° C., soaped with a warm and feebly alkaline solution of soap and rinsed with hot water.

The following table gives the tints of a number of the dyestuffs, prepared according to the present process, and of the color lakes obtained therefrom:

| Diazocompound of— | Combined with— | Shades. | Diazocompound of— | Combined with— | Shades. |
|---|---|---|---|---|---|
| 3-chloroanilin | Ortho-anisidid of 2.3-oxynaphthoic acid. | Orange. | 5-nitro-1.2-toluidin | 2.3-oxynaphthoyl-4-chloro-1.2-anisidin. | Red. |
| 2-chloroaniline | ....do............ | Yellowish red. | 3-nitro-1.4-toluidin | ....do............ | Reddish bordeaux. |
| 2.5-dichloroanilin | ....do............ | Yellowish red. | m-aminoazotoluene | ....do............ | Like garnet. |
| 4-chloro-1.2-toluidin | ....do............ | Red. | 5-chloro-1.2-toluidin | 2.3-oxynaphthoyl-5-chloro-1.2-anisidin. | Bluish red. |
| 5-chloro-1.2-toluidin | ....do............ | Bluish red. | | | |
| 6-chloro-1.2-toluidin | ....do............ | Red. | | | |
| 4-chloro-1.3-toluidin | ....do............ | Yellowish red. | 6-chloro-1.2-toluidin | ....do............ | Yellowish red. |
| 4-chloro-1.2-anisidin | ....do............ | Bluish red. | 4-chloro-1.2-anisidin | ....do............ | Bordeaux. |
| 5-nitro-1.2-anisidin | ....do............ | Bordeaux. | 3-nitro-1.4-toluidin | ....do............ | Bordeaux. |
| 4-nitro-1.2-anisidin | ....do............ | Red. | 3-nitro-1.4-toluidin | 2.3-oxynaphthoyl-4-nitro-1.2-anisidin. | Bluish red. |
| 4-nitro-1.2-toluidin | ....do............ | Yellowish red. | | | |
| 5-nitro-1.2-toluidin | ....do............ | Bordeaux. | | | |
| 3-nitro-1.4-toluidin | ....do............ | Bordeaux. | 5-nitro-1.2-anisidin | ....do............ | Reddish bordeaux. |
| 4-chloro-2-nitroanilin | ....do............ | Bordeaux. | 2.5-dichloroanilin | 2.3-oxynaphthoyl-3-amino-1.4-cresolmethyl-ether. | Yellowish red. |
| 3-nitro-1.4-toluidin | Ortho-phenetidid of 2.3-oxynaphthoic acid. | Red. | | | |
| 4-chloro-2-nitroanilin | ....do............ | Bluish red. | 3-nitro-1.4-toluidin | ....do............ | Bluish red. |
| Dianisidin | ....do............ | Reddish blue. | 5-nitro-1.2-toluidin | ....do............ | Bordeaux. |
| Ortho-phenetol-azo-α-naphthoylamin. | ....do............ | Black. | 2.5-dichloroanilin | 2.3-oxynaphthoyl-3-amino-1.4-cresolethyl-ether. | Yellowish red. |
| 4-chloro-1.2-toluidin | 2.3-oxynaphthoyl-4-chloro-1.2-anisidin. | Red. | | | |
| | | | 3-nitro-1.4-toluidin | ....do............ | Bluish red. |
| 5-chloro-1.2-toluidin | ....do............ | Bluish red. | 5-nitro-1.2-toluidin | ....do............ | Bluish red. |
| 6-chloro-1.2-toluidin | ....do............ | Red. | 4-nitro-1.2-anisidin | 2.3-oxynaphthoyl-aminohydroquinone-dimethyl-ether. | Red. |
| 2-chloro-1.4-toluidin | ....do............ | Red. | | | |
| 3-chloro-1.4-toluidin | ....do............ | Red. | | | |
| 4-chloro-2-nitroanilin | ....do............ | Bluish red. | | | |
| 4-chloro-1.2-anisidin | ....do............ | Bordeaux. | 4-chloro-1.2-anisidin | ....do............ | Bluish red. |
| 5-chloro-1.2-anisidin | ....do............ | Reddish bordeaux. | 2.5-dichloroanilin | ....do............ | Brownish orange. |
| 4-nitro-1.2-anisidin | ....do............ | Bluish red. | | | |

Now what we claim and desire to secure by Letters Patent is the following:

1. As new articles the azodyestuffs, which can be obtained by combining any diazocompound with an ortho-alkyloxyarylid of 2.3-oxynaphthoic acid, having probably the general formula:

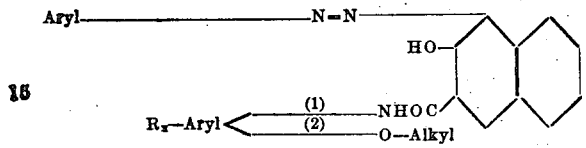

wherein R means hydrogen or any radicle, which can be used for the production of color lakes of an excellent fastness to light and give, when produced on the fiber, orange to blue and black shades of a singular fastness to light, they are when dry orange to blue and black powders, insoluble in water, soluble in sulfuric acid to a violet to green solution yielding upon reduction with stannous chloride an amin and an ortho-alkyloxyarylamin of the 1-amino-2-oxy-3-naphthoic acid.

2. The process of making azodyestuffs consisting in combining any diazocompound with an ortho-alkyloxyarylid of the 2.3-oxynaphthoic acid of the general formula:

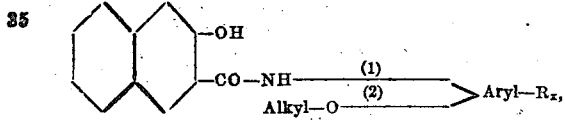

wherein R means hydrogen or any radicle.

3. As new articles the azodyestuffs, which can be obtained by combining any diazocompound with an ortho-methoxyarylamin of 2.3-oxynaphthoic acid, having probably the general formula:

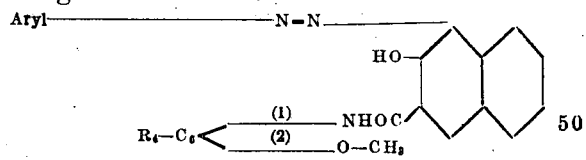

wherein R means hydrogen or any radicle, which can be used for the production of color lakes of an excellent fastness to light and give, when produced on the fiber, orange to blue and black shades of a singular fastness to light, they are when dry orange to blue and black powders, insoluble in water, soluble in sulfuric acid to a violet to green solution yielding upon reduction with stannous chloride an amin and an ortho-methoxyarylamin of the 1-amino-2-oxy-3-naphthoic acid.

4. The process of making azodyestuffs consisting in combining any diazocompound with an orthomethoxyarylamin of 2.3-oxynaphthoic acid of the general formula:

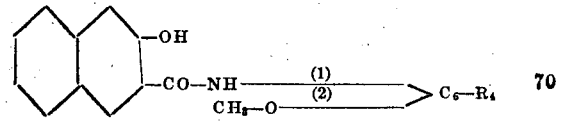

wherein R means hydrogen or any radicle.

In testimony that we claim the foregoing as our invention, we have signed our names.

AUGUST LEOPOLD LASKA.
ARTHUR ZITSCHER.

Witnesses:
  W. W. SCHOTT,
  C. C. L. B. WYLES.